Jan. 19, 1971 W. STELZER 3,556,615
SKID CONTROL SYSTEM
Filed Oct. 28, 1968 3 Sheets-Sheet 1

INVENTOR.
William Stelzer
BY Harness, Dickey & Pierce
ATTORNEYS.

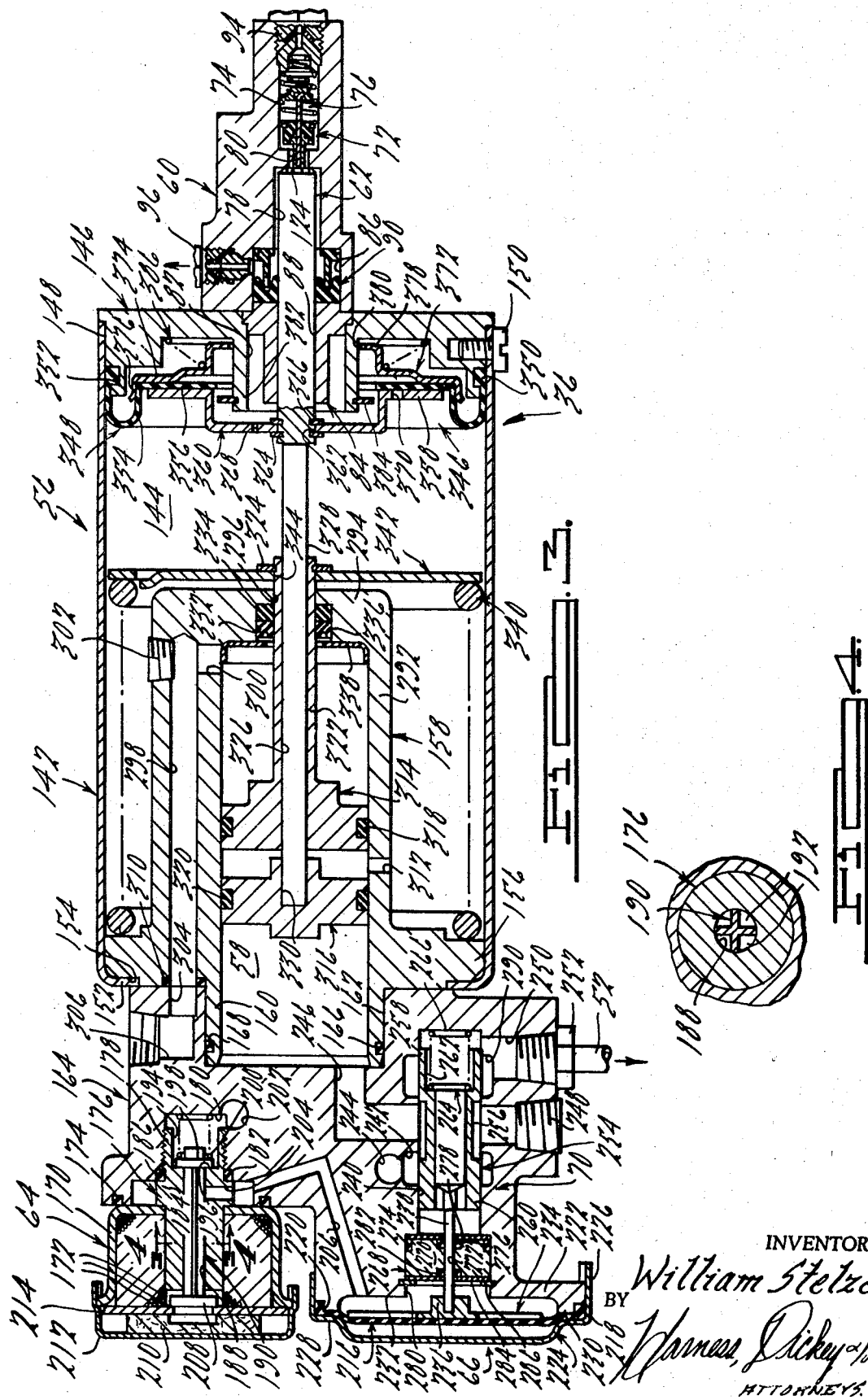

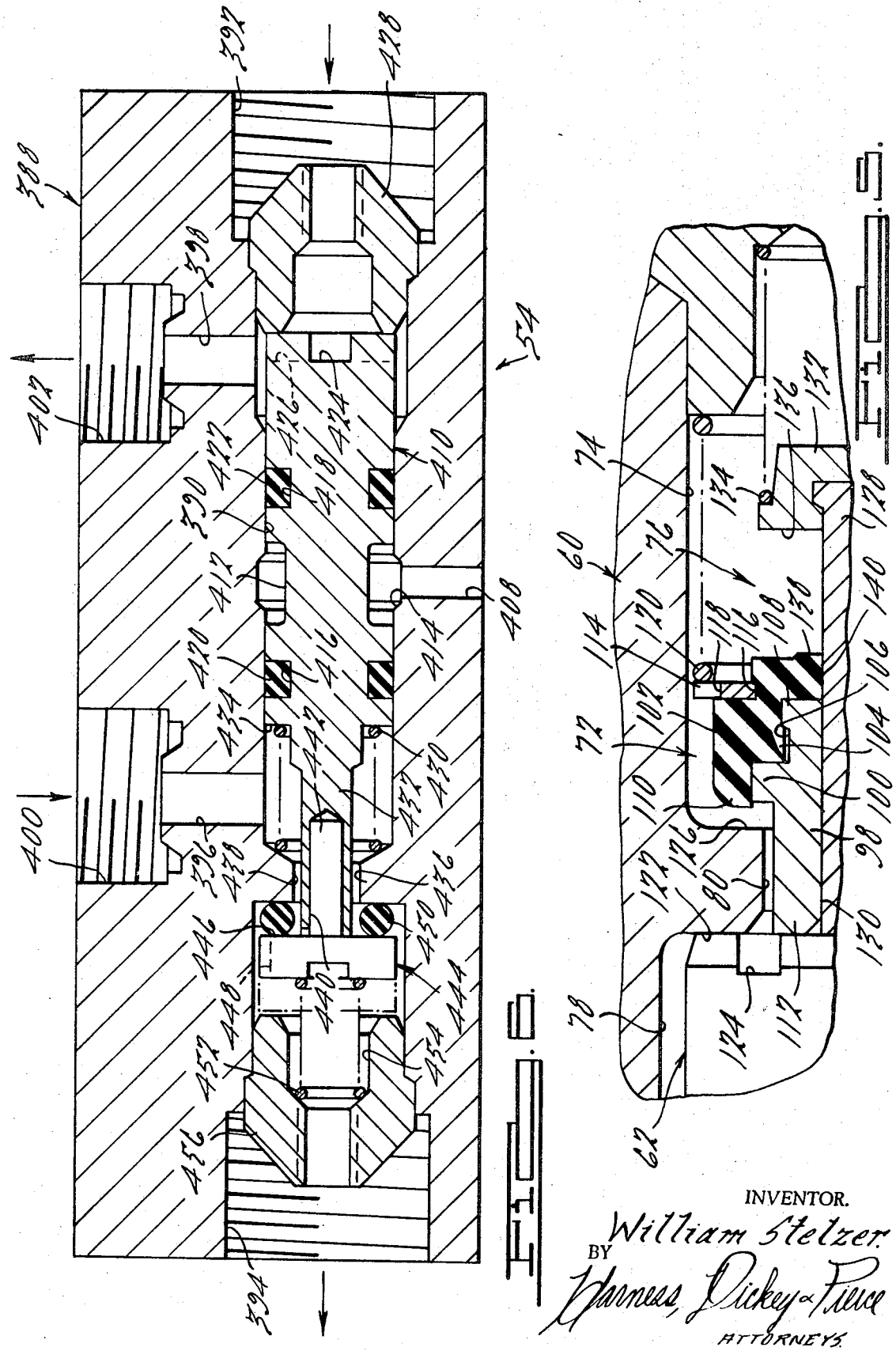

United States Patent Office 3,556,615
Patented Jan. 19, 1971

3,556,615
SKID CONTROL SYSTEM
William Stelzer, Milford, Mich., assignor to Kelsey-Hayes
Company, Romulus, Mich., a corporation of Delaware
Filed Oct. 28, 1968, Ser. No. 771,167
Int. Cl. B60t 8/08
U.S. Cl. 303—21
29 Claims

ABSTRACT OF THE DISCLOSURE

A skid control system adapted for operative association with the fluid actuated braking system of an automotive or similar type vehicle; the system including a modulating valve assembly for selectively controlling the flow or supply of hydraulic brake actuating fluid between the master brake cylinder of the vehicle and one or more of the wheel cylinders thereof; the modulating valve being operable in response to and actuable by an increase in fluid pressure from an ancillary or auxiliary fluid pressure source; the skid control system further including an interlocking valve cooperable with the modulating valve assembly for positively preventing inadvertent or premature deactuation thereof in response to variations in fluid pressure from the aforesaid auxiliary fluid source.

BACKGROUND OF THE INVENTION

Under certain road conditions, application of maximum braking pressure, and frequently less than maximum pressure, of automobile and similar type vehicular braking systems, results in skidding and a locked in wheel and/or skid condition. It is, of course, well established that if the wheels of a vehicle are locked or are skidding excessively, the coefficient of friction between the vehicle wheels and the surface of the road over which the vehicle is traveling can decrease, and the effectiveness of the vehicle braking system in decelerating and stopping the vehicle can be substantially reduced. This is especially true for low coefficient of friction road surfaces. It has been theorized that the maximum coefficient of friction, and hence the optimum braking efficiency can be achieved when the vehicle wheels, instead of being in a totally locked or nonrotatable condition, are permitted to slip or partially rotate between 10 and 20 percent, with such wheel slip being defined as the ratio of the difference between the velocity of the car (Vc) and the braked wheel velocity (Vw) with respect to the car velocity (Vc), i.e., $Vc-Vw/Vc$.

Generally speaking, the present invention relates to a vehicle skid control system which is adapted to function in selectively controlling the vehicle braking system such that the operative characteristics thereof simulate, as closely as possible, the ideal braking pressure at which the vehicle may be decelerated and stopped in the minimum amount of time. Accordingly, it is a general function of the skid control system of the present invention to permit a controlled amount of wheel slippage during braking and to positively prevent locked wheel conditions from occurring upon application of a maximum braking pressure by the vehicle operator. The skid control system of the present invention achieves such optimum braking characteristics through the utilization of a novel control or modulating valve assembly which functions to selectively control the flow of hydraulic brake actuating fluid from the master cylinder of the vehicle braking system to the various brake wheel cylinders. The modulating valve assembly utilizes an ancillary source of hydraulic fluid as a means for selectively opening and closing a valve mechanism interposed in the vehicle braking system, with such ancillary source of actuating fluid being communicable to the modulating or control valve in response to an electrical signal transmitted from a control module which receives information concerning the condition of the vehicle wheels.

The modulating valve assembly is associated and cooperable with an interlocking valve mechanism which is interposed in the hydraulic circuit between the source of ancillary fluid pressure and the modulating valve and is adapted to function in "locking in" fluid pressure within the valve assembly in the event minor variations in fluid pressure occur within the source of ancillary actuating fluid. The modulating valve assembly is also provided with a "failsafe" feature which assures that the valve mechanism controlling the flow of braking fluid from the master cylinder to the wheel cylinders of the vehicle is automatically biased to an open position in the event of a sudden drop in fluid pressure from the ancillary source thereof, thus assuring that the vehicle braking system will not be rendered inoperative in the event of a component failure or malfunction of the skid control system.

SUMMARY OF THE INVENTION

This invention relates generally to vehicular skid control systems and, more particularly, to a new and improved skid control system incorporating a novel control or modulating valve assembly and cooperable fluid interlocking valve which are adapted to be actuated by a source of pressurized hydraulic fluid ancillary to the hydraulic brake actuating fluid system of the associated vehicle.

It is accordingly a general object of the present invention to provide a new and improved vehicular skid control system for controlling the braking system of automotive and similar type vehicles.

It is a more particular object of the present invention to provide a new and improved skid control system which utilizes a source of pressurized fluid ancillary from the source of hydraulic braking fluid as a means for effecting selective actuation thereof.

It is yet a more particular object of the present invention to provide a skid control system of the above character which incorporates a novel modulating or control valve actuable by the source of ancillary fluid in response to an electrical control signal indicating the imminence of a vehicle wheel skid condition.

It is a further object of the present invention to provide a new and improved skid control system of the above character wherein the control or modulating valve thereof is provided with means for assuring proper communication of hydraulic braking fluid from the master cylinder to the vehicle brakes in the event of an unexpected reduction in fluid pressure of the ancillary fluid source, and which further includes an interlocking valve assembly interposed between the source of the ancillary fluid and the modulating valve assembly for preventing deactuation of the modulating valve in the event of minor variations in fluid pressure of the ancillary source.

It is yet a further object of the present invention to provide a modulating or control valve of the above character which features a novel throttling valve.

It is another object of the present invention to provide a skid control system as above described wherein the source of ancillary fluid may be provided by a transmission pump, power steering pump or the like, as is commonly available on modern automotive and similar type vehicles.

Other objects and advantages of the present invention will become apparent from the following detailed description taken in conjunction with the accompanying drawings.

BRIEF DESCRIPTION OF THE DRAWINGS

FIG. 3 is an enlarged cross-sectional view of the modulating valve assembly incorporated in the skid control system of the present invention;

FIG. 4 is a fragmentary transverse cross-sectional view taken substantially along the line 4—4 of FIG. 3;

FIG. 5 is an enlarged fragmentary view of a portion of the structure illustrated in FIG. 3; and FIG. 6 is an enlarged cross-sectional view of the interlocking valve assembly incorporated in the skid control system of the present invention.

DETAILED DESCRIPTION OF A PREFERRED EMBODIMENT

General description of environment and function

Figure 1:
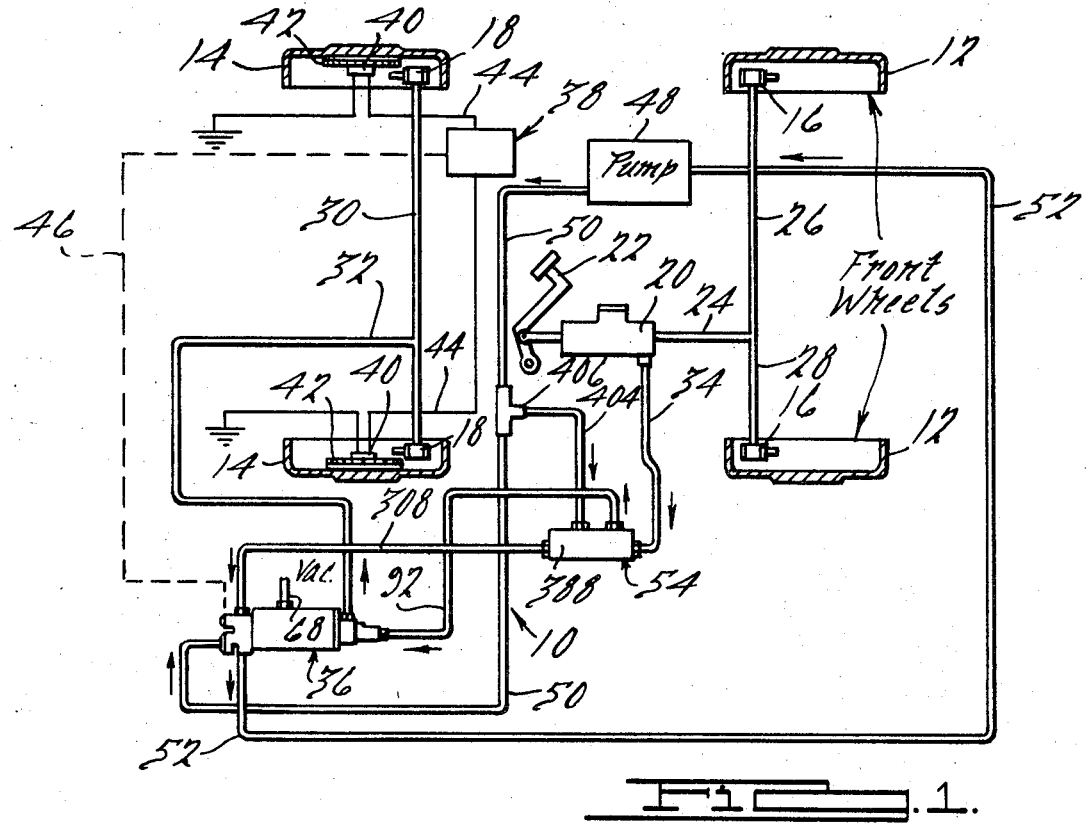
FIG. 1 is a schematic diagram of the skid control system embodying the principles of the present invention.

Generally speaking, FIG. 1 is a schematic diagram of a skid control system, generally designated by the numeral 10, embodying the principles of the present invention and shown in operative association with a vehicular braking system including front and rear brake drums 12 and 14 and associated front and rear brake cylinders 16 and 18, respectively. The skid control system 10 of the present invention, although being adapted to be operatively associated with either pair of front and rear wheel cylinders 16 and 18, or with both pairs thereof, for purposes of simplicity of description of the present invention, the system 10 will be shown and described in operative association only with the rear wheel cylinders 18 of the vehicular braking system shown in FIG. 1. It will, of course, be also noted that the skid control system 10 of the present invention may be readily utilized in connection with various types of braking systems other than the vehicular braking system shown in FIG. 1, and may also find particularly useful application in aircraft braking systems of the type well known in the art.

The aforementioned vehicle braking system also comprises a master cylinder assembly 20 which is operable in response to actuation of a conventional foot or brake pedal 22 to communicate hydraulic braking fluid therefrom through fluid conduits or lines 24, 26 and 28 to the front wheel cylinders 16. The rear wheel cylinders 18 are operatively connected by means of a common fluid conduit 30 which is in turn connected through another fluid conduit 32 to the skid control system 10 of the present invention. The master cylinder 20 is also connected to the skid control system 10 through a suitable fluid conduit or line 34, as illustrated in FIG. 1, and as will hereinafter be described in detail. It will be noted that the vehicle brakes associated with the brake drums 12 and 14 may be of conventional design, the construction and operation of which are well known in the art, and hence the details thereof have been omitted for purposes of simplicity.

The skid control system 10 of the present invention generally comprises a modulating valve assembly 36 that is actuatable in accordance with and in response to an electrical signal produced by an electrical control module 38. The module 38 receives information from suitable means such as sensors 40 associated with each of the brake drums 14, for example, through suitable exciter rings 42. The exciter rings 42 and sensors 40 may be of any construction well known in the art, and since these members constitute no material part of the present invention, the specific details concerning the construction and operation thereof have been omitted. By way of example, the exciter rings 42 may be of a toothed construction, and the sensors 40 may be of a permanent or electromagnetic construction which together define a variable reluctance pickup. During normal operation of the associated vehicle, the excitor rings 42 would be rotated concomitantly with the brake drums 14, and hence simultaneously with the associated vehicle wheels, and by virtue of their toothed construction, the rings 42 would, via the sensors 40, produce electrical signals which are transmitted through associated conductors 44 to the control module 38, thus providing a signal to the module 38 responsive to the rotational velocity of the vehicle wheels associated with the brake drums 14.

The control module 38 is designed and constructed to sense the rate of change in the signals received through the conductors 44, and hence to sense the rate of deceleration of the wheels associated with the brake drums 14, and to produce an output signal responsive to the magnitude of the deceleration of the wheels associated with the drums 14 reaching a preselected magnitude corresponding to a skid condition existing or to be occurring at said wheels. The output or control signal is adapted to be transmitted from the control module 38 through a suitable conductor 46 to the modulating valve assembly 36. In the system of the present invention, the control module 38 can provide merely an "on" or "off" signal and modulation of the fluid pressure to the brake cylinders 18 will be provided by the valve assembly 36. It will be noted that in some skid control systems, the fluid pressure to the vehicle brakes is varied in response to an electrical output signal of varying magnitude; however, in the present invention, the fluid pressure is varied or controlled by the valve assembly 36 in response to a signal of substantially constant amplitude which permits the remainder of the system to be considerably simplified.

Figure 2:
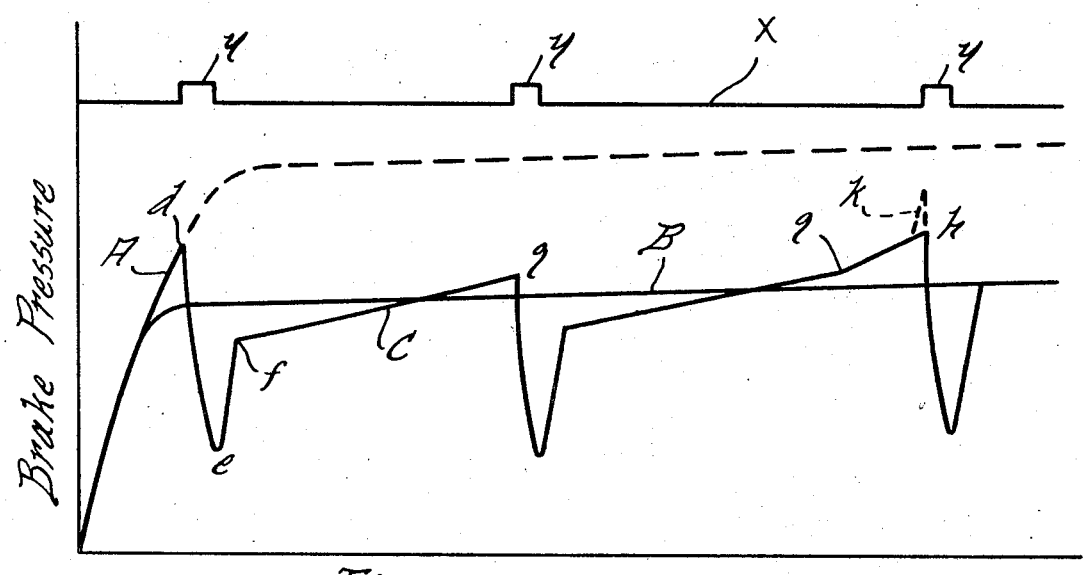
FIG. 2 is a graphical representation of the fluid brake pressure versus time and includes a curve of the electrical control system effecting selective energization of the skid control system of the present invention.

FIG. 2 illustrates a graphical representation of the relationship between brake pressure and time during a normal braking application. Curve A depicts the relationship of the brake fluid pressure and time wherein the pressure is increased from zero to the maximum fluid pressure available in the system. The brake pressure curve for braking the vehicle at the desired degree or amount of wheel slip, i.e., the relationship shown by the formula $Vc-Vw/Vc$, wherein the maximum coefficient of friction is utilized, is shown as curve B. Braking pressures slightly above the pressures indicated by curve B will result in excessive wheel slip; however, it will be seen that the maximum pressure indicated by the curve B is less than the maximum obtainable pressure of the system (curve A), and hence indicates that relief from the maximum brake pressure is desirable in order to decelerate and stop the associated vehicle in the shortest possible distance. Generally speaking, it is a function of the skid control system 10 of the present invention to provide operational characteristics which, as closely as possible, simulate the ideal pressure curve B. It will be noted, of course, that depending upon the surface conditions of the road over which the associated vehicle is traveling, the ideal curve B will vary somewhat, and hence a family of ideal pressure curves would actually exist for different road conditions. However, for purposes of simplicity of description, only one of such curves has been shown.

In the skid control system 10 of the present invention, the modulating valve assembly 36 will provide for a modulated brake pressure curve C in response to the output signals received from the control module 38. The curve C approximates the ideal pressure curve B and hence provides characteristics for stopping the vehicle in the shortest possible distance. The curve X depicts the output signal Y from the control module 38, and shows the time relation between the signals Y and pressure curve C.

The skid control system 10 of the present invention is adapted to be operatively associated with a source of pressurized actuating fluid which is ancillary and preferably entirely independent from the hydraulic braking system of the associated vehicle. The source of such ancillary actuating fluid may be provided by any one of a number of well known fluid pumping devices conventionally associated with automotive and similar type vehicles, such as a fluid pump driven off the crankshaft, fan belt or the like of a vehicle engine; however, in a preferred construction of the present invention, such means for providing an ancillary source of hydraulic actuating fluid is achieved through the use of a mechanically actuated transmission pump, representatively designated in FIG. 1 by the numeral 48 and communicable with the skid control system 10 through fluid supply and return lines or conduits 50 and 52, respectively. The pump 48 may be of any well known construction and is adapted to pump hydraulic actuating fluid to the system 10 upon normal operation of the vehicle transmission (not shown).

The modulating valve assembly 36 is cooperable with an associated fluid interlocking valve assembly, generally designated 54, which functions in maintaining a preselected fluid pressure within the valve assembly 36 in the event there is any minor variation in the fluid pressure level originating from the pump 48. Accordingly, and as will hereinafter be described in detail, pressurized actuating fluid originating from the pump 48 will be communicated through the interlocking valve assembly 54 and thereafter to the valve assembly 36.

In general, the modulating valve assembly 36 comprises a housing 56 defining a hydraulic fluid chamber 58 and having a cylindrical housing 60 mounted on one end thereof. The housing 60 is provided with a slidably hydraulic piston 62 which is mechanically linked to means within the chamber 58 which is actuateable in response to fluid pressure conditions transmitted thereto from the pump 48. The housing 56 is provided with an electrically energized solenoid mechanism 64 whose plunger is movable between open and closed positions selectivley communicating a source of vacuum pressure to one side of a diaphragm assembly 66 also located within the housing 56. The vacuum source may be and preferably is provided by the manifold vacuum conditions existent within the vehicle engine during normal operation thereof, with the source being communicable with the valve assembly 36 through a suitable manifold vacuum line or conduit 68. The diaphragm assembly 66 is mechanically linked to a fluid valve mechanism 70 which is actuatable in response to movement of the diaphragm assembly 66 to open a fluid passage or circuit between the fluid supply conduit 50 and the hydraulic chamber 58.

Generally speaking, when the control module 38 provides an output signal (Y) indicating a skid condition, energization of the solenoid mechanism 64 occurs, and the solenoid plunger is unseated, allowing the vacuum source to be communicated to one side of the diaphragm assembly 66. The opposite side of the assembly 66 is at atmospheric pressure, with the result that the assembly 66 will be selectively biased toward the vacuum side thereof, resulting in actuation of the valve mechanism 70 in a manner so as to block the flow of hydraulic actuating fluid from the pump 48 to the chamber 58 which results in movement through the aforementioned linkage of the hydraulic piston 62. As the piston 62 moves, the volume within the housing 60 increases, and at the same time a check valve 72 is seated, thereby precluding any further application of the master cylinder brake pressure to the rear brake cylinders 14 and hence to the wheels being skid controlled. The brake cylinder pressure which has already been built up within the cylinder 14 will be relieved by flowing into the increased volume created in the housing 60 by the aforesaid movement of the piston 62. With such relief of the brake cylinder pressure, the associated wheels are free to spin up or increase in speed, until such time as the control module 38 deenergizes the solenoid mechanism 64 (as the Y signal terminates), allowing the plunger of the solenoid mechanism 64 to be biased to a position blocking communication between the vacuum source and the diaphragm assembly 66. In this condition, the valve mechanism 70 will be opened, resulting in the piston 62 being moved to its original position and the check valve 72 being unseated, whereby the master cylinder pressure will again be applied through the modulating valve assembly 36 directly to the brake cylinders 14.

In operation of the skid control system 10, brake pressure will be increased along the sloped portion of curve A until skid condition occurs, such as, for example, at point D; this condition will be sensed, as previously described, and the control module 38 will transmit an output control signal Y to actuate the solenoid mechanism 64, whereby the piston 62 will be moved out of the cylinder 60, resulting in a decrease in the brake pressure from point $d$ to point $e$ (FIG. 2). At a point along the curve $d$ to $e$, the associated vehicle wheels will have had an opportunity to spin up or regain speed, whereby the output signal from the module 38 is terminated, resulting in reactuation of the modulating valve assembly 36 through deenergization of the solenoid mechanism 64. It will be noted that the initial brake pressure at point $d$ was above the ideal pressure curve B, and upon actuation of the valve assembly 36, the brake pressure dropped to a point below the ideal curve B. With the brake pressure above or below the curve B, the maximum coefficient of friction for braking is not achieved, and it is a feature of the present invention that the modulating valve assembly 36 operates in a manner so as to return the fluid pressure as rapidly as possible to a point which is proximate to the ideal curve B, and then to provide for a gradual increase of the fluid pressure along a gradually inclined curve, such as from point $f$ to point $g$, and since the curve from $f$ to $g$ approximates the shape of the ideal shape curve B, nearly as ideal braking pressure as is possible will be achieved.

Construction and operation of the modulating valve assembly

For purposes of clarity, the terms "inwardly," "outwardly" and derivatives thereof will have reference to the geometric center of the modulating valve assembly 36 of the present invention and the various component parts thereof. Similarly, the terms "forwardly." "rearwardly" and the like will have reference to the assembly, as shown in FIG. 3, with the forward and rearward ends thereof being located at the right and left sides, respectively, of FIG. 3.

Referring now in detail to the construction of the modulating valve assembly 36, and in particular to the cylindrical housing 60 thereof, as best seen in FIGS. 3 and 5, the housing 60 defines a cylindrical chamber 74 which is adapted to house the aforementioned check valve assembly 72 and a bleeder valve 76 which are similar in construction to the check valve and bleeder valve shown and described in copending United States application Ser. No. 702,095, filed Jan. 31, 1968, and assigned to the assignee of the present application, which copending application is incorporated by reference in the descriptive portion of this application. The cylindrical chamber 74 is coaxially aligned and communicable with a relief chamber 78 within which the hydraulic piston 62 is operatively disposed. A cylindrical bore 80 interconnects the chambers 74 and 78 and is of a reduced diameter relative thereto. The chamber 78 is connected in line with an enlarged bore 82 formed in the end of the housing 56, as will later be described, and an annular sleeve or support bearing 84 is located within the bore 82 and extends partially into an enlarged portion 86 of the relief chamber 78. The bearing 84 defines a central annular opening 88 adapted to support the piston 62 for longitudinal sliding movement. The piston 62 extends into the relief chamber 78 and is spaced radially inwardly from the periphery thereof. A fluid cup-like seal 90 is disposed adjacent the bearing 84 and aligned axially therewith at the end of the enlarged portion 86 and is adapted to peripherally sealingly engage the piston 62. As will later be described, the housing 60 is communicable with the interlocking valve assembly 54 through a fluid line or conduit 92 that is attached by means of a suitable fluid fitting 94 to the housing 60. The fluid line 92 is connected in fluid communication with the enlarged portion 86 of the chamber 78 through suitable hydraulic fitting means 96, and hence fluid to the brake cylinders 14 must pass from the conduit 92, through the cylindrical chambers 74, 78 and fitting means 96 to the conduit 92.

The check valve assembly 72 is located in the cylindrical chamber 74 and bore 80 and includes a valve body 98 which has an enlarged head portion 100 located in the chamber 74. The valve body 98 has an annular, flexible seal 102 having a radially inwardly extending ring portion 104 which is received in a groove 106 located between the head portion 100 and a reduced diameter flange 108. The flexible seal 102 is generally cup-shaped and overlies the head portion 100, groove 106, flange 108 and the rearward surface of the valve body 98. The forward end of the seal 102 has an annular sealing lip 110 which extends axially beyond the forward end of head portion 100 and provides a sealing action in a manner to be described. The valve body 98 has a forwardly extending portion 112 which is of reduced diameter and extends through the bore 80 and provides a substantial radial clearance therewith to facilitate the flow of fluid therebetween. An annular ring 114 is supported in an annular groove 116 at the rearward end of seal 102 and is in close clearance relation with the wall of the chamber 74. The outer periphery of the ring 114 is notched (see FIG. 5), as seen at 118, to provide for unrestricted fluid flow between opposite sides thereof. Thus, the ring 114 radially pilots the valve body 98 and seal 102 permitting for an enlarged passage between the forward portion 112 of valve body 98 and bore 80. A spring member 120 is in engagement with the ring 114 and is biased to continuously urge the valve body 98 to a closed position. The hydraulic piston 62 is normally held in engagement against an annular shoulder 122 which is defined by the juncture of the bore 80 and the relief chamber 78. The end of the piston 62 has a pair of cross slots 124 (defining chords in the circular end of piston 62) which are in communication with the clearance between bore 80 and forward portion 112 of the valve body 98. In a normally deactuated condition of the modulating valve 36, with the piston 62 located against the shoulder 122, the spring 120 urges the valve body 98 toward the cylindrical chamber 74 with the forward portion 112 engaging the end of the piston 62. In this condition, the sealing lip 110 is located in clearance relation with the walls of the chamber 78 and hence communicates the chamber 74 with the chamber 78 via the clearance past bore 80 and cross slots 124. In this condition, normal braking can be effectuated since fluid can freely pass through line 92 to line 32 to the wheel brake cylinders 14 via the modulating valve assembly 36. Upon the occurrence of a skid condition whereby a skid control output signal is derived from the control module 38, the piston 62 is moved outwardly from the relief chamber 78 and the spring 120 moves the valve body 98 in the same direction, moving the sealing lip 110 into engagement with a shoulder 126 of the chamber 74 to substantially seal cylinder 74 from cylinder 78. At this point fluid from the master cylinder 20 to conduit 32 is generally cut-off.

As previously noted, the bleed valve assembly 76 is located in the chamber 74 and is also actuated by the piston 62 and hence upon sufficient movement of piston 62 out of chamber 78, the bleed valve assembly 76 will also be closed. The assembly 76 includes an elongated stem 128 which extends through a bore 130 in valve body 98 and is in close clearance therewith. One end of the elongated stem 128 is located against the end of the piston 62 when the valve assembly 76 is in its normally deactuated position, as shown in FIG. 5. The opposite end of the elongated stem 128 is connected to a cap 132 which is engaged by a spring 134 that urges the cap 132 and stem 128 in a direction toward the chamber 78 to a closed position. The elongated stem 128 has an annular sealing surface 136 which is engageable with an annular, rearwardly facing sealing boss 138 in the seal 102 to close the clearance passage between the bore 130 and stem 128. In its actuated, closed position, the stem 128 extends substantially beyond the end of stem or forward portion 112 of the valve body 98 such that on the return of piston 62, the bleed valve assembly 76 will be opened before the check valve assembly 72; this serves a purpose to be later described. Since actuation of the piston 62 is rapid, closing of the main passage through the check valve assembly 72 and the closing of the secondary restricted passage through the bleed valve assembly 76 occur in relatively rapid succession. The seal 102 has a radially inner surface 140 which engages the stem 128, and the surface 140 is "scalloped" to permit the flow of fluid for the bleed valve function. It will be noted that the seal 102 provides a sealing function for the check valve 72 and also for the bleed valve 76.

As the hydraulic piston 62 is withdrawn from the chamber 78, the volume thereof is increased, whereby the fluid pressure in the cylinder 78 and in the lines 30, 32 and hence in the wheel brake cylinders 14 will be relieved. Relief of the fluid pressure will cause a decrease in the braking of the associated wheels, thereby permitting the wheels to spin-up or to regain speed.

The housing 56 comprises an annular, generally cylindrical-shaped thin walled member 142 which defines a generally cylindrical volume or cavity 144 and is closed at the end thereof adjacent the housing 60 by means of an end plate 146. The end plate 146 is formed with a peripheral recessed portion 148 therearound within which the adjacent end of the member 142 is received. Suitable radially extending screws, bolts or the like 150 are preferably provided for fixedly securing the end plate 146 within the end of the member 142. As illustrated in FIG. 3, the member 146 is formed at the center thereof with the bore 82 within which the bearing 84 is operatively mounted, with the housing 60 being suitably mounted at a position axially aligned with the bore 82 on the outer side of the end plate 146. The end of the member 142 opposite that which is received within the recess portion 148 is formed with a radially inwardly extending flange portion 152 which is received within a radially inwardly extending recessed portion 154 formed around a radially outwardly extending flange section 156 provided on the end of an axially extending, generally cylindrical-shaped member 158 that is disposed interiorly of the housing 56. The member 158 is formed with a cylindrical internal cavity constituting the hydraulic fluid chamber 58 which functions in a manner later to be described in effecting longitudinal sliding movement of the hydraulic piston 62. The end of the member 158 circumjacent the chamber 58 is formed with an annular axially outwardly extending section 160 which is received within an annular recess 162 of a manifold member, generally designated 164, that is disposed on the end of the housing 56 opposite the housing 60. As illustrated, suitable O-ring sealing means or the like 166 is disposed within an annular recess 168 formed around the periphery of the section 160 and is engageable with the recess 162 for providing a fluid-tight seal between the members 158 and 164. As will hereinafter be described in detail, the manifold member 164 is communicable with the fluid supply line 50, fluid return line 52 and vacuum line 68, and is adapted to operatively support the solenoid mechanism 64 and diaphragm assembly 66.

Referring now in detail to the construction of the solenoid mechanism 64, as illustrated in FIG. 3, said mechanism 64 comprises a generally cup-shaped external enclosure 170 which houses a plurality of windings, generally designated 172, that are connected to the conductor 46 leading from the control module 38. The inner end of the enclosure 170 is engaged with the outer side of the manifold member 164, with suitable O-ring sealing means or the like 174 being provided interjacent the juncture of the enclosure 170 and member 164 to provide a fluid-tight seal therebetween. Extending axially of the mechanism 64 is an annular valve member, generally designated 176 is formed with an axially extending central bore 188 is threadably received with an annular bore 180 formed in the outer side of the manifold member 164. Preferably O-ring sealing means or the like 182 is provided between an annular radially outwardly extending shoulder 184 of the valve member 176 and a radially extending portion 186 formed circumjacent the bore 180. The valve member 176 is formed with an axially extending central bore 188 adapted to slidably receive an elongated valve stem 190 which is generally X-shaped in transverse section (see FIG. 4) and defines four circumferentially spaced axially extending passages 192 with the periphery of the bore 188. The end section 178 of the valve member 160 is formed with an annular recess 194 which defines a radially extending valve seat 196 adapted to be engaged by a generally radially extending valve closure member 198 mounted on the end of the valve stem 190. The closure member 198 and valve stem 190 are adapted to be resiliently urged toward a position wherein the member 198 abuttingly engages the valve seat 196 by means of a helical coil spring or the like 200 which extends between the inner side of the member 198 and the end of the bore 180. Upon energization of the mechanism 64, the valve stem 190 and closure member 198 will move axially inwardly (toward the right) in FIG. 3, whereby to open communication between the bores 180 and 188. Similarly, upon deactuation of the mechanism 64, the spring 200 will effect axially outward movement of the valve stem 190 and closure member 198, whereby the member 198 will be tightly engaged with the valve seat 196.

As best seen in FIG. 3, the manifold member 164 is formed with an annular bore 202 which is communicable through suitable fitting means (not shown) with the vacuum conduit 68. Upon actuation of the mechanism 64, the vacuum condition within the conduit 68 is transmitted through the bores 202 and 180 to the interior of the bore 188 through the passages 192 defined therein. The bore 188 is communicable through a radially extending passage 204 and a generally L-shaped passage 206 with the interior of the diaphragm assembly 66 for effecting actuation thereof, as will hereinafter be described. Thus, it will be seen that actuation and deactuation of the solenoid mechanism 64 in response to a control signal received through the conductor 46 from the control module 38 will result in vacuum conditions being communicated to the diaphragm assembly 66.

The end of the valve stem 190 opposite the closure member 198 is provided with a closure member 208 similar to the member 198 which is adapted to be biased into engagement with the end of the valve member 176 upon actuation of the mechanism 64 and thereby close the outer end of the bore 188 to prevent any loss of vacuum from within the solenoid mechanism 64. Preferably, the mechanism 62 is provided with a suitable air filter 210 which is disposed between the member 212 and a plurality of segments 214 on the outer side of the enclosure 170, with the filter 210 functioning to prevent any road dirt, dust or the like from ingressing from the atmosphere into the interior of the solenoid mechanism 64 or manifold member 164. The segments 214 are located at their inner ends in an annular groove in the member 208 and are fulcrumed at their outer ends to members 212; the segments are spaced from the windings 172 to permit axial movement of the stem 190.

Referring now in detail to the construction of the diaphragm assembly 66, as best seen in FIG. 3, said assembly comprises a generally flat, flexible diaphragm member 216 having an enlarged thickness peripheral edge portion 218 that is received within an annular recess 220 formed around an outwardly projecting section 222 of the manifold member 164. The diaphragm member 216 is fixedly secured to the member 164 by means of an annular cover plate 224 having a generally axially projecting flange portion 226 which extends around the section 222 of the member 164. The plate 224 is formed with an annular depressed section 228 at a position spaced radially inwardly from the flange portion 226 thereof, which section 228 is adapted to clampingly secure the adjacent portion of the diaphragm member 216 to an axially outwardly extending shoulder portion 230 formed around the section 222, whereby to provide an air-tight seal around the periphery of the diaphragm member 216. The side of the diaphragm member 216 opposite the cover plate 224 confronts an annular cavity or recess 232 which is communicable with the passage 206 and hence with the vacuum conduit 68. Accordingly, upon actuation of the solenoid mechanism 64, the vacuum conditions within the conduit 68 will be communicated to the interior side of the diaphragm member 216, thereby causing said member to move or flex inwardly due to the differential pressure conditions on the opposite sides thereof. An annular diaphragm plate 234 is secured to the inner side of the diaphragm member 216 and comprises an enlarged thickness central portion 236 which is adapted to carry an axially extending valve stem 238 that projects interiorly of the plate 234 into an elongated, generally axially extending valve bore 240 formed in the lower end of the manifold member 164. The bore 240 is communicable through an annular recess 242 therearound with a fluid passage 244 which is in turn communicable with the fluid supply conduit 50 that is attached to the manifold 164 through suitable fluid fitting means (not shown). The bore 240 is also communicable with a generally L-shaped passage 246 which is communicable with the interior of the fluid chamber 58 at the upper end thereof and is closed by a suitable plug or the like 248 at the lower end thereof. The innermost end of the bore 240 is communicable with a downwardly extending passage 250 which is connected through suitable fitting means 252 with the fluid return conduit 52.

Disposed within the bore 240 is a generally cylindrical-shaped valve member 254 that is fixedly secured to the end of the valve stem 238 opposite that which is attached to the diaphragm plate 234. Accordingly, the valve member 254 is adapted to move longitudinally or axially within the valve bore 240 in response to and simultaneously with longitudinal movement of the valve stem 238 and diaphragm plate 234. The valve member 254 is formed with an annular radially inwardly extending recess 256 therearound which divides the periphery thereof into axially spaced valve sections 258 and 260 that are peripherally engaged with the bore 240 and are adapted to selectively close or block communication between the bore 240 and recess 242 and passage 250, as will be described. The interior end of the member 254 is formed with an annular bore or recess 262 which is adapted to receive one end of a helical coil spring 264. The opposite end of the spring 264 is adapted to abuttingly engage the inner end of the bore 240, as seen at 266. The spring 264 is adapted to resiliently resist movement of the valve member 254 toward the right within the valve bore 240 in a manner hereinafter to be described.

Interposed between the valve bore 240 and the interior side of the annular recess 232 is a partition assembly which consists of an annular partition member 270 defining a central bore 272 through which the valve stem 238 extends. Suitable O-ring sealing means 274 and 276 are retained against the partition member 270 by an annular retaining plate 278 and are adapted to sealingly engage the periphery of an annular counterbore 280 and the periphery of the valve stem 238. Similar O-ring sealing means 282 is retained against the outer side of the partition member 270 by a retaining plate 284 and snap ring 286, the sealing means 282 being adapted to peripherally engage the valve stem 238 to provide a fluid-tight seal therearound.

In operation of the modulating valve assembly 36, the spring 264 is adapted to maintain the valve member 254 in position illustrated in FIG. 3, wherein the passage 244 is communicable through the recess 242, valve bore 240, and passage 246 with the interior of the chamber 58, whereby pressurized actuating fluid from the vehicle transmission pump 48 can be supplied to the interior of the chamber 58, for reasons hereinafter to be described. At such time as the vacuum conditions existing within the vacuum conduit 68 are communicable to the interior of the annular recess 232, i.e., upon actuation of the solenoid mechanism 64, the differential pressure conditions existing adjacent the interior and exterior sides of the diaphragm 216 will cause said member to be moved inwardly, thereby biasing the valve stem 238 and valve member 254 axially inwardly within the bore 240. As the valve member 254 is moved inwardly, the valve section 260 thereof will block communication between the annular recess 242 and valve bore 240, thereby preventing any further fluid to flow from the transmission pump 48 into the valve bore 240. Immediately thereafter, the valve section 258 of the valve member 254 will move out of registry with an annular recess 290 which is communicable with the fluid passage 250 and thereby provide communication between the interior of the valve bore 240, and hence interior of the fluid passage 246 and fluid chamber 58, with the fluid return conduit 52, whereby to permit actuating fluid within the chamber 58 to be returned to the transmission pump 48. It will be noted that the valve sections 258 and 260 on the valve member 254 are arranged such that upon axially inwardly movement of the member 254, the annular recess 242 will be closed to the valve bore 240 prior to opening of the annular recess 290 and fluid passage 250 so as to prevent actuating fluid from being merely pumped into the valve bore 240 from the passage 244 and annular recess 242 and then being immediately returned to the transmission pump 48 through the recess 290 and passage 250. Similarly, upon axially outward movement of the valve member 254, the valve section 258 blocks communication between the interior of the bore 240 and the passage 250 immediately prior to the valve section 260 opening the fluid circuit between the fluid passage 244 and recess 242 with the interior of the valve bore 240.

The cylindrically shaped member 158, as best seen in FIG. 3, comprises an annular side wall section 292 that terminates at the end thereof opposite the flange section 156 in a generally radially extending end wall section 294 which defines a central annular bore 296. The side wall section 292 is formed with longitudinally extending passage 298 which is communicable with a radially inwardly extending passage 300 that is closed by a suitable plug or the like 302 at the outer end thereof and is communicable with the interior of the chamber 58 at the inner end thereof. The opposite end of the passage 298 is communicable with an aligned passage 304 formed in the manifold member 164, which passage 304 is in turn communicable with an outlet passage 306 that is communicable through suitable fitting means (not shown) to a fluid line or conduit 308 which extends between the modulating valve assembly 36 and the interlocking valve assembly 54 and functions in a manner later to be described. It will be noted that suitable fluid sealing means in the form of a conventional O-ring or the like 310 is provided at the juncture of the fluid passages 298 and 304 of the member 158 and 164 to provide a fluid-tight joint therebetween. Also, the interior of the chamber 58 is adapted to be communicable with the volume or cavity 144 defined by the member 142 through a suitable radially extending bleed or vent opening 312.

Disposed within the hydraulic fluid chamber 58 is a pair of reciprocable piston members 314 and 316 which are provided with suitable peripheral sealing means 318 and 320, respectively, adapted to peripherally engage the interior of the side wall section 292 of the cylindrical member 158. The piston member 314 is formed with an integral, axially extending piston rod 322 which extends through the bore 296 and is provided with an annular snap or retaining ring 324 on the end thereof. The piston 314 and rod 322 define an axially extending central bore 326 within which an elongated cylindrical piston rod 328 is slidably disposed. One end of the piston rod 328 is received within and fixedly secured to an annular recess or bore 330 formed on the inner side of the piston member 316, while the opposite end of the piston rod 328 extends axially outwardly from the end of the piston rod 322 carrying the snap ring 324 and abuts against the end of the hydraulic piston 62, as best illustrated in FIG. 3. The bore 296 is formed with a counterbore 332 within which suitable packing and sealing means 334 and 336, respectively, are retained by a generally cup-shaped retaining member 338 disposed in the adjacent end of the fluid chamber 58.

Disposed circumjacent the cylindrical member 158 and interiorly of the member 142 is a helical coil spring, generally designated 340. The rearward end of the spring 340 is adapted to abut against the interior side of the radially extending flange section 156, and the opposite (forward) end of the spring 340 is adapted to abut against a generally radially extending bearing or spring plate 342 which is formed with a central annular opening 344 within which the adjacent end of the piston rod 322 is received, the plate 342 being retained upon the end of the piston rod 322 by means of the aforementioned snap ring 324, as will be apparent. It will be seen that as the fluid pressure increases within the left end of the chamber 58, the piston member 316 will be biased toward the right end of the member 158 independently of the piston member 314, and similarly, upon an increase of fluid pressure within the right end of the chamber 58, the piston member 314 will be biased toward the left end of the member 158 independently of the piston 316 as will hereinafter be described in connection with the description of the overall operation of the skid control system 10 of the present invention.

Disposed within the end of the cavity 144 adjacent the end plate 146 is a throttle valve assembly, generally designated 346, which is adapted to function in selectively controlling longitudinal movement of the piston rod 328 and hydraulic piston 62. The assembly 344 comprises an annular flexible valve seal member 348 which is formed with an enlarged thickness peripheral section 350 that is clampingly secured by the adjacent end of the member 142 within an annular recess 352 formed around the periphery of the end plate 146. From the peripheral section 350, the member 248 extends axially away from the plate 146 and is formed with a reverse-bend portion 254 which terminates in a generally radially inwardly extending valve or sealing portion 356. The sealing portion 356 is adapted to selectively contiguously or sealingly engage a generally radially extending valve seat section 358 of an annular valve plate member 360. The member 360 is formed with a central annular opening 362 within which one end of the hydraulic piston 62 is received, and suitable snap ring means 364 and 366 is provided on the end of the piston 62 adjacent the opposite sides of the valve plate 360 for fixedly securing said member 360 to the piston 62. The valve plate member 360 is formed with a bleed opening 368 and with one or more valve ports 370 adapted to be selectively closed when the sealing portion 356 of the member 348 is engaged with the valve seat section 358 in the manner shown in FIG. 3.

Disposed on the opposite (outer) side of the sealing portion 356 from the valve plate member 360 is an annular, generally cup-shaped spring retainer member 372 that comprises a generally radially extending portion 374 contiguously engageable with the valve seal member 348 and which terminates at the radially outer end thereof in a generally axially extending peripheral flange section 376. The innermost portion of the retainer member 372 is formed with a generally radially extending guide portion 378 that defines an annular opening 380, the periphery of which is spaced slightly radially outwardly from an axially inwardly extending collar section 382 formed integrally of the end plate 146 and defining the aforementioned bore 82. The retainer member 372 is adapted to move axially inwardly and outwardly along the collar section 382, with axially inward movement being limited by an annular snap ring or the like 384 provided on the axially innermost end of the section 382. Disposed interjacent the spring retainer member 372 and the interior side of the end plate 146 is a helical conical spring member 386 which abuts against the interior side of the plate 146 at one end thereof and against the exterior side of the retainer member 372 at the opposite end thereof. The spring member 386 is adapted to function in normally resiliently urging the member 372, sealing portion 356 and valve plate member 350 axially inwardly of the housing 56, and by virtue of the fact that the plate member 360 is secured to the interior end of the hydraulic piston 62, the spring member 386 also functions to exert an axially inwardly directed biasing force against the piston 62.

Briefly, operation of the throttle valve assembly 346 is as follows. During normal operation of the braking system of the associated vehicle, the hydraulic piston 62 is disposed in the position shown in FIG. 3, as are the piston members 316, 314 and piston rods 322 and 328, whereby hydraulic brake fluid is communicated in a normal manner from the master cylinder assembly 20 to the rear wheel cylinders 18. At such time as a skid condition exists, the control module 38 will transmit the appropriate output signal, resulting in actuation of the solenoid mechanism 64 and diaphragm assembly 66, whereby the piston members 314, 316 and piston rods 322, 328 will be biased toward the left in FIG. 3, whereby the outer end of the piston rod 328 will be moved out of engagement with the adjacent end of the piston 62, with the result that the piston 62 will be biased toward the left under the influence of the brake fluid pressure from the master cylinder 20. This results in a decrease in brake pressure to the rear wheel cylinders 18 in order to permit the rear wheels of the vehicle to spin up. After the wheels have been permitted to spin up a preselected amount, the signal from the control module 38 is discontinued, and through deactuation of the solenoid mechanism 64 and diaphragm assembly 66, the piston member 316 will be biased toward the right in FIG. 3. As this occurs, the hydraulic piston 62 will be moved toward the right into the chamber 78, causing pressure to be reapplied to the rear wheel cylinders 18. This procedure will occur very rapidly. As the piston 62 moves toward the right under the influence of the piston 328, the volume of air between the valve plate member 360 and the end plate 146 will be permitted to escape through the valve port 370; however, as the plate member 360 approaches the sealing portion 356 of the valve seal member 348, the sealing portion 356 closes the port 370. Thereafter, the air that is remaining between the end plate 146 and plate member 360 must escape through the bleed opening 368 which offers a substantial restriction to the flow of such air. This restriction results in a throttling effect or slowing down of movement of the hydraulic piston 62 toward the right, which in turn results in the brake pressure being reapplied at a reduced rate. This throttling action will continue until such time as the hydraulic piston 62 has traveled to the position shown in FIG. 3, or until a subsequent output signal is received from the control module 38.

Interlocking valve assembly

Referring now in detail to the construction of the valve assembly 64, as best seen in FIG. 6, said assembly comprises a valve housing or enclosure 388 within which is formed an elongated cylindrical valve chamber 390. The housing 388 is formed with a pair of counterbores 392 and 394 which are communicable with the opposite ends of the chamber 390 and are adapted to threadably receive suitable fluid fitting means (not shown) for operatively connecting the fluid conduits or lines 34 and 308, respectively, with the valve chamber 390. The enclosure 388 is also formed with a pair of outwardly extending bores 396 and 398 which are communicable with the interior of the valve chamber 390 at the inner ends thereof and are communicable with counterbores 400 and 402, respectively, at the outer ends thereof. The counterbore 402 is adapted to threadably receive suitable fluid fitting means (not shown) which secures one end of the fluid conduit or line 92 to the enclosure 388, and the counterbore 400 is adapted to theadably receive suitable fluid fitting means (also not shown) which connects one end of a suitable fluid conduit 404 to the enclosure 388. The opposite end of the conduit 404 is communicable through a suitable T-fitting 406 with the fluid supply conduit 50 leading from the transmission pump 48, as best illustrated in FIG. 1. It will thus be seen that hydraulic braking fluid is adapted to be communicated from the master cylinder assembly 20 through the conduit 34 to the interior of the chamber 390, which fluid is communicable through the passage 398 and conduit 92 to the modulating valve assembly 36. Similarly, ancillary actuating fluid is communicable to the valve assembly 54 through the conduit 404 from the transmission pump 48, which fluid is communicable from the enclosure 388 through the conduit 308 to the modulating valve assembly 36. It will be seen that the enclosure 388 is also provided with a suitable vent or bleed opening 408 which is communicable at its inner end with the interior of the valve chamber 390.

Disposed within the valve chamber 390 is an elongated cylindrical valve spool 410 which is formed with a central annular recessed portion 412 which is communicable with an annular recess 414 formed in the chamber 390 at a position axially aligned with the opening 408. The valve spool 410 is also formed with a pair of axially spaced recesses 416 and 418 within which a pair of suitable sealing members 420 and 422 are disposed, the sealing members 420, 422 being adapted to peripherally engage the side of the chamber 390 so as to provide a fluid-tight seal between the outer periphery of the valve spool 410 and chamber 390. The end of the valve spool 410 adjacent the counterbore 392 is formed with a pair of diametrically extending cross slots 424 and 426 which are adapted to provide for fluid communication between the interior of the counterbore 392 and the bore 398. The end of the valve spool 410 in which the cross slots 424, 426 are formed is adapted to be normally abuttingly engaged with the inner side of a suitable fluid fitting member 428 disposed in the the counterbore 392 by means of a helical valve spring 430. The spring 430 extends circumjacent a reduced diameter section 432 formed at the end of the spool 410 and is adapted to abut at one end thereof against a radially outwardly extending shoulder or face 434 defined by the spool 410. The opposite end of the valve spring 430 is adapted to abut against a radially inwardly extending neck section 436 formed at the adjacent end of the chamber 390, the neck section 436 defining a reduced diameter annulus 438 through which the end of the spool section 432 extends. By virtue of the provision of the cross slots 424, 426 in the spool 410, fluid communication is maintained from the conduit 34 to the conduit 92 regardless of the fact that the adjacent end of the spool 410 is engaged with the interior side of the fitting means 428 by the spring 430.

The valve spool section 432 is formed with a cylindrical bore 440 in the outer end thereof, the bore 440 being adapted to slidably receive a generally cylindrically-shaped valve stem section 442 of a valve member 444 that extends radially outwardly from the adjacent end of the spool section 432. The valve member 444 defines a valve face or seat 446 and is formed with a plurality of circumferentially spaced, radially inwardly extending notches or recessed portions 448 around the periphery thereof. The valve seat 446 is normally resiliently engaged with an O-ring sealing member 450 by means of a helical coil spring 452 which abuttingly engages the outer side of the member 444. The outer end of the spring 452 is received within and supported by an annular recess 454 defined by a fluid fitting member 456 mounted in the counterbore 394.

In operation of the interlocking valve assembly 54, pressurized fluid is normally provided through the conduit 404, which fluid enters the assembly 54 into the bore 396 and flows through the chamber 390 and biases the valve member 444 to the dotted line position in FIG. 6, whereby such fluid is free to flow out of the chamber 390 through the conduit 308 and to the modulating valve assembly 36. At such time as the fluid pressure source drops below a preselected pressure, or is in any way interrupted, the spring 452 will resiliently bias the valve member 444 into engagement with the sealing member 450 so as to prevent loss of pressure within the conduit 308. Thus, the valve member 444 acts as a check valve to assure that the pressure within the conduit 308 does not drop below said preselected level, even though the fluid pressure at the transmission pump 48 may vary somewhat and occasionally drop below this level.

The valve spool 410 is adapted to operate and function as a "safety" valve and thereby assure that the valve member 444 will remain in an open or unseated condition in the event there is a pressure drop in excess of a predetermined magnitude in the fluid supply line 50 or pump 48. More particularly, during normal operation of the skid control system 10 of the present invention, the valve spool 410 is engaged with the inner side of the member 428 by means of the coil spring 430 and the pressure from the pump 48 acting against the face 434, with the result that the valve member 444 is free to move to and from a seated and unseated position, as above described. At such time as the brakes of the vehicle are applied, and the brake line pressure exceeds the pump ressure, a differential pressure condition will exist between the opposite ends of the spool 410. As a result of this differential pressure condition, the spool 410 will move toward the left in FIG. 6 against the resistance of the spring 430, thereby biasing the valve member 444 to the open dotted line position shown in FIG. 6. The spool 410 will maintain the valve member 444 in an open condition during the entire time the differential pressure condition exists, thereby assuring that the ancillary actuating fluid may freely exhaust from the right end of the member 158, so that the coil spring 340 may function in its capacity in providing for a failsafe operation of the skid control system 10, as will hereinafter be described in detail. Thus, the valve spool 410 assures continued effective operation of the vehicle braking system, even though some malfunction may occur in the pump 48 or other part of the skid control system 10 of the present invention.

Operation of entire system

In operation of the skid control system 10 of the present invention, assuming the initial conditions that the associated vehicle is operating and that the transmission pump 48 thereof is functioning to supply actuating fluid through the supply line 50 to the interlocking valve assembly 54 and modulating valve assembly 36, the various component parts of the valve assemblies 54 and 36 are as is shown in FIGS. 6 and 3, respectively, with the exception that the valve member 444 of the valve assembly 54 will be disposed in the phantom open position, whereby pressurized fluid is free to flow from the conduit 404 to the conduit 308.

At such time as the vehicle brakes are applied under conditions wherein a wheel skid becomes imminent, the control module 38 will transmit a control signal (signal Y) through the conductor 46 to the modulating valve assembly 36. Receipt of this signal by the assembly 36 results in actuation of the solenoid mechanism 64, allowing the vacuum source to be communicated from the bore 202, through the passage 206 to the inner side of the diaphragm member 216, resulting in the member 216 being biased inwardly, thereby causing the valve stem 238 and valve member 254 to move axially inwardly within the bore 240 to selectively block communication between the bore 240 and the passage 246, and open communication between the bore 240 and the passage 250. When the fluid communication is blocked between the passage 244 and chamber 58, the pressure conditions within the chamber 58 on the left side of the piston member 316 will be less than the existing brake pressure in chamber 78 with the result that the brake line pressure will bias the piston 62, piston rod 328 and piston member 316 toward the left in FIG. 3. As the piston 62 thus moves toward the left, the volume within the housing 60 increases to relieve the fluid pressure transmitted to the rear wheel cylinders 18, thereby permitting the rear wheels of the vehicle to spin-up. Simultaneously, the check valve 72 will be closed, thereby precluding any further application of the master cylinder brake pressure to the wheel cylinders 18.

At such time as the rear wheels of the vehicle have had an opportunity to spin-up or rotate to a preselected speed, the control signal (Y) from the module 38 to the modulating valve assembly 36 will be terminated, at which time the solenoid mechanism 64 will be deactuated, resulting in the vacuum circuit between the vacuum source and the passage 206 being closed, with the further result that the diaphragm member 216 and valve member 254 will be biased toward the left in FIG. 3 under the influence of the coil spring 254. As this occurs, fluid communication will be provided between the passage 244 and the chamber 58 through the passage 246, with the result that the piston member 316 will be biased toward the right in FIG. 3. Accordingly, the piston rod 328 will bias the hydraulic piston 62 toward the right into the chamber 78, causing pressure to be reapplied to the rear wheel cylinders 18. As the piston 62 moves toward the right, the volume of air between the valve plate member 360 and the end plate 346 will escape through the valve port 270 until such time as the sealing portion 356 of the member 348 closes the port 370. Thereafter, the air that remains between the plate 346 and member 360 will escape through the bleed opening 368, whereby to create a throttling effect or slowing down of the return movement of the piston 62, with the further result that the brake pressure will be reapplied at a reduced rate. This throttling action will continue until the hydraulic piston 62 has traveled to the position shown in FIG. 3, wherein the check valve assembly 72 is opened, or until a subsequent control signal (Y) is received trom the module 38.

A particular feature of the modulating valve assembly 36 resides in a "failsafe" characteristic provided by the helical coil spring 340 thereof. In particular, it will be seen that the spring 340, spring plate 342, piston 314 and piston rod 322 are normally maintained in the positions shown in FIG. 3 due to the pressure of the ancillary fluid within the right end of the member 158, with the spring 340 being thus maintained under a state of compression. However, at such time as the pressure of the ancillary fluid drops below a preselected level for any unforeseen reason, and provided the brakes are applied where a sufficient hydraulic line pressure exists, the spring 340 will, via the spring plate 342, bias the piston rod 322 toward and into engagement with the inner end of the hydraulic piston 62, thereby positively maintaining the piston 62 in the position shown in FIG. 3, whereby normal braking pressures can be applied from the master cylinder 20 to the rear wheel cylinders 18. Thus in the event of some unforeseen malfunction in the skid control system 10 of the present invention, wherein the fluid pressure from the transmission pump 48 drops below a preselected level, the coil spring 340 will automatically bias the piston 62 toward and maintained in the position wherein free fluid communication is provided between the master cylinder 20 and the wheel cylinders 18 so that the malfunction does not impair normal braking action of the vehicle.

Depending upon the conditions of the road and the fluid requirements of the brake system (due to fade, etc.), the ideal required pressure may change and it is desirable that actual applied pressure change accordingly. The bleed valve assembly 76 aids in this regard. As the piston 62 is moved back to its original position upon deactuation of the solenoid mechanism 64, it engages the stem 128 of the bleed valve assembly 76 prior to engagement with the portion 112 of the check valve body 98. When this occurs, fluid from the master cylinder 20 to the fluid line 92 will gradually be applied to the wheel cylinders 18 through the restricted path defined by the slight clearance between the bore 130 and the stem 128. This will permit a gradual or controlled increase in the brake pressure from the point $g$ to the point $h$ (FIG. 2) and result in curve C closely following curve B even when an increase in brake pressure or more fluid is required by the system. If the bleed valve 76 were not utilized and if additional pressure were required by the system before the occurrence of another skid condition, then when the piston 62 opened the check valve 72 a sharp or uncontrolled increase in pressure from point $g$ to point $k$ would occur, resulting in a substantial departure from the ideal curve B. The pressure differentials between point $d$ and point $e$ and point $d$ and point $f$ are substantially fixed, since for each actuation of the valve assembly 36, the piston 62 is moved the same maximum distance out of the cylinder 78. The point $g$, however, is not fixed and can change in magnitude depending on the existing conditions. Thus by reaching the point $k$, the entire curve C would be raised (since the differentials $d$ to $e$ and $e$ to $f$ are fixed) and the excursions of that curve would be farther from the ideal curve B. Accordingly, by use of the bleed valve assembly 76 in combination with the check valve 72, the modulating valve assembly 36 will provide a brake pressure curve C closely approximating the ideal brake pressure. In order to closely approximate the curve B the time from point $d$ to point $e$ is held to a minimum and the time from point $e$ to point $f$ is also held to a minimum; however, the time from point $f$ to point $g$ is made substantially longer since that part of the operational cycle (point $d$ to point $g$) closely follows the curve B. Thus over the total elapsed time of the operational cycle ($d$ to $g$) a good portion of the time is at pressures close to the ideal.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

I claim:

1. In a skid control system for controlling fluid pressure actuated brakes of at least one wheel of a wheeled vehicle by controlling the fluid pressure supplied from a source of brake actuating fluid to the brakes, control means providing an output signal in response to the existence of a skid condition at the one wheel, means including a source of pressurized hydraulic fluid ancillary to the source of brake actuating fluid and provided by the vehicle engine for relieving the pressure of the brake actuating fluid supplied to the brakes in response to said output signal, modulating means for selectively relieving the pressure of the brake actuating fluid supplied to the brakes, said modulating means including diaphragm means actuatable in response to differential pressure conditions adjacent the opposite sides thereof, a vacuum source communicable with one side of said diaphragm, and valve means selectively blocking communication between said vacuum source and said diaphragm in response to said output signal.

2. A skid control system as defined in claim 1 which includes a transmission pump actuatable by the vehicle engine transmission to provide said source of ancillary pressurized hydraulic fluid.

3. A skid control system as defined in claim 2 which includes interlocking valve means for preventing the pressure of the fluid of the ancillary source thereof which is communicated to said modulating means from dropping below a preselected magnitude.

4. A skid control system as defined in claim 1 wherein said modulating means includes piston means and means communicating said ancillary source of pressurized fluid along a first path to one side of said piston means whereby said ancillary fluid acts to bias said piston means in a preselected manner, and which includes valve means for selectively controlling the flow of said ancillary fluid along said path.

5. A skid control system as defined in claim 4 which includes means normally biasing said piston means toward a position operable to relieve the pressure of the brake actuating fluid supplied to the brakes.

6. A skid control system as defined in claim 5 which includes spring means normally biasing said piston means and wherein said ancillary fluid is communicable along said first path to act against said piston means in the same direction as said spring means and wherein said ancillary fluid is communicable along a second path to act against said piston and said spring means.

7. A skid control system as defined in claim 6 which includes interlocking valve means providing for normal communication of said ancillary fluid along said second path, but movable to a condition closing said second path in response to a decrease in fluid pressure of said ancillary source.

8. A skid control system as defined in claim 1 which includes modulating means having a control cycle and actuatable in response to said output signal for initiating said control cycle, with said cycle including relieving the pressure of the brake actuating fluid supplied to the brakes from a first magnitude to a second magnitude below said first magnitude and rapidly increasing the magnitude of the pressure of the brake actuating fluid toward a third magnitude between said first and second magnitudes and subsequently gradually increasing the magnitude of pressure of the brake actuating fluid towards said third magnitude.

9. A skid control system as defined in claim 8 wherein said modulating means is selectively actuated by said ancillary source of pressurized fluid.

10. A skid control system as defined in claim 8 wherein said modulating means initiates relief of fluid pressure of said brake actuating fluid in response to initiation of said output signal from said control means and initiates reapplication of fluid pressure of said brake actuating fluid in response to termination of said output signal.

11. In a skid control system for controlling fluid pressure actuated brakes of at least one wheel of a wheeled vehicle by controlling the fluid pressure supplied from a source of brake actuating fluid to the brakes, control means providing an output signal in response to the existence of a skid condition at the one wheel, operator means for relieving the pressure of the brake actuating fluid supplied to the brakes in response to said output signal, a source of pressurized hydraulic fluid ancillary to the source of brake actuating fluid for actuating said operator means, interlocking valve means for controlling the flow of the ancillary fluid from said source thereof to said operator means, said interlocking valve means comprising:
check valve means for preventing the pressure of said ancillary fluid supplied to said operator means from dropping below a preselected level,
said interlocking valve means including means responsive to differential pressure conditions between the pressure of said ancillary fluid and said brake actuating fluid for maintaining said check valve means in an open condition and thereby provide for the continuous flow of said ancillary fluid between said source thereof and said operator means.

12. A skid control system as defined in claim 11 wherein said source of ancillary fluid is provided by a vehicle engine driven pump means.

13. A skid control system as defined in claim 11 wherein said operator means comprises a modulating means for selectively relieving the pressure of the brake actuating fluid supplied to the brakes.

14. A skid control system as defined in claim 11 which includes a valve seat, a check valve engageable with said valve seat, spring means normally urging said check valve toward said valve seat, a spool valve, spring means normally urging said spool valve away from said check valve, said spool valve being movable against the resistance of each of said spring means for biasing said check valve out of engagement with said valve seat.

15. A skid control system as defined in claim 14 wherein said spool valve is communicable at one portion thereof with the brake actuating fluid and at another portion thereof with the ancillary fluid.

16. A skid control system as defined in claim 11 wherein said operator means comprises piston means actuatable by said source of ancillary fluid, and wherein said operator means further includes means defining first and second fluid paths communicable with the opposite sides of said piston means, and first and second valve means for selectively controlling communication of said ancillary fluid along said first and second paths.

17. A skid control system as defined in claim 16 wherein said first valve means is operable in response to said control signal.

18. A skid control system as defined in claim 16 wherein said second valve means comprises said interlocking valve means.

19. In a skid control system for controlling the fluid pressure applied to the brakes of at least one wheel of a wheeled vehicle from a source of brake actuating fluid, a modulating valve assembly comprising:
pressure control means operable to control the magnitude of the pressure of the brake actuating fluid supplied to the brakes,
actuating means including a source of pressurized fluid ancillary to the source of brake actuating fluid and adapted to actuate said pressure control means,
said pressure control means having a first condition for relieving the fluid pressure to the brakes, a second condition not relieving the fluid pressure to the brakes and intermediate conditions from said first to said second conditions in which fluid pressure is reapplied to the brakes,
said actuating means operable with said pressure control means and actuatable in response to a control signal for rapidly placing said pressure control means in said first condition and for rapidly placing said pressure control means in one of said intermediate conditions and gradually operating said pressure control means toward said first condition.

the first rate of operation of said pressure control means from said first condition to said one intermediate condition being substantially greater than the second rate of operation of said pressure control means from said one intermediate condition towards said second condition, interlocking valve means for controlling the flow of said ancillary fluid in response to a decrease of a preseleceted magnitude in fluid pressure at said source thereof, said actuating means comprising piston means actuatable by said source of ancillary fluid, means for normally biasing said piston means towards a position wherein said pressure control means is operable at said second condition, whereby said piston means will automatically be biased to said position wherein said pressure control means operates at said second condition in the event of a decrease in fluid pressure of said ancillary fluid, and means defining first and second fluid paths for communicating said ancillary pressurized fluid to said piston means.

20. A skid control system as defined in claim 19 wherein said pressure control means includes check valve means for blocking fluid pressure from said source of brake actuating fluid to the brakes in said first and intermediate conditions.

21. A skid control system as defined in claim 19 wherein said pressure control means includes bleed valve means for permitting restricted flow of said brake actuating fluid from the source thereof to the brakes at an intermediate condition after said one intermediate condition and before said second condition.

22. A skid control system as defined in claim 19 which includes throttling valve means operable to provide said second rate of operation.

23. A skid control system as defined in claim 19 wherein said pressure control means comprises second piston means operatively disposed in a relief chamber communicable with the source of brake actuating fluid, said second piston means being movable into and out from said relief chamber in response to movement of said actuating means, and which includes check valve means and bleed valve means communicable with the circuits operatively connecting said source of brake actuating fluid with said relief chamber.

24. A skid control system as defined in claim 19 wherein said source of said ancillary fluid includes pump means operated by the vehicle engine.

25. A skid control system as defined in claim 19 wherein said interlocking valve assembly includes check valve means movable to an open condition in order to permit said ancillary fluid to flow from said source thereof toward said piston means and movable to a closed position when the pressure of said ancillary fluid drops below a preselected level.

26. A skid control system as defined in claim 25 which includes spool valve means responsive to a differential pressure condition between the brake fluid pressure and the ancillary fluid pressure for maintaining said check valve means in said open position.

27. The invention as set forth in claim 1 which includes failsafe means for maintaining brake pressure in the event of a preselected drop in pressure of said ancillary fluid.

28. In a skid control system for controlling fluid pressure actuated brakes of at least one wheel of a wheeled vehicle by controlling the fluid pressure supplied from a source of brake actuating fluid to the brakes, control means providing an output signal in response to the existence of a skid condition at the one wheel, operator means for relieving the pressure of the brake actuating fluid supplied to the brakes in response to said output signal, a source of pressurized hydraulic fluid ancillary to the source of brake actuating fluid for actuating said operator means, and interlocking valve means for controlling the flow of the ancillary fluid from said source thereof to said operator means, failsafe means for overriding said operator means and thereby maintaining the pressure of the brake actuating fluid in the event of a preselected drop in pressure of said ancillary fluid.

29. In a skid control system for controlling the fluid pressure applied to the brakes of at least one wheel of a wheeled vehicle from a source of brake actuating fluid, a modulating valve assembly comprising:

pressure control means operable to control the magnitude of the pressure of the brake actuating fluid supplied to the brakes, actuating means including a source of pressurized fluid ancillary to the source of brake actuating fluid and adapted to actuate said pressure control means, said pressure control means having a first condition for relieving the fluid pressure to the brakes, a second condition not relieving the fluid pressure to the brakes and intermediate conditions from said first to said second conditions in which fluid pressure is reapplied to the brakes, said actuating means operable with said pressure control means and actuatable in response to a control signal for rapidly placing said pressure control means in said first condition and for rapidly placing said pressure control means in one of said intermediate conditions and gradually operating said pressure control means toward said first condition, the first rate of operation of said pressure control means from said first condition to said one intermediate condition being substantially greater than the second rate of operation of said pressure control means from said one intermediate condition towards said second condition, and interlocking valve means for controlling the flow of said ancillary fluid in response to a decrease of a preselected magnitude in fluid pressure at said source thereof, failsafe means for maintaining said pressure control means in one of said conditions in the event of a preselected drop in pressure of said ancillary fluid.

References Cited

UNITED STATES PATENTS

| | | | |
|---|---|---|---|
| 3,269,781 | 8/1966 | Van House | 303—21 |
| 3,286,734 | 11/1966 | Hartshorne | 303—21 |
| 3,322,471 | 5/1967 | Faiver et al. | 303—21 |
| 3,306,677 | 7/1967 | Dewar et al. | 303—21 |
| 3,401,987 | 9/1968 | Horvath | 303—21 |

MILTON BUCHLER, Primary Examiner

J. J. McLAUGHLIN, Jr., Assistant Examiner

U.S. Cl. X.R.

188—181; 303—10